United States Patent Office 3,442,784
Patented May 6, 1969

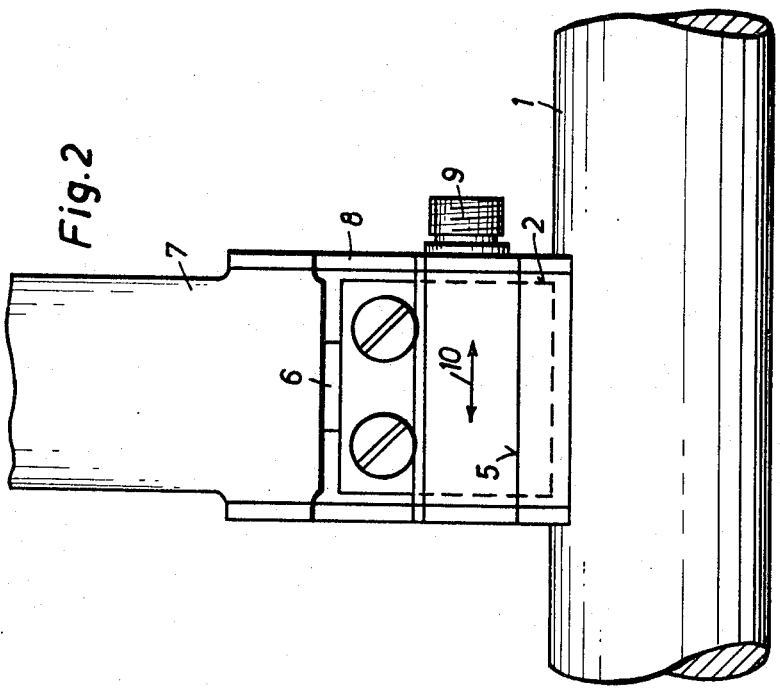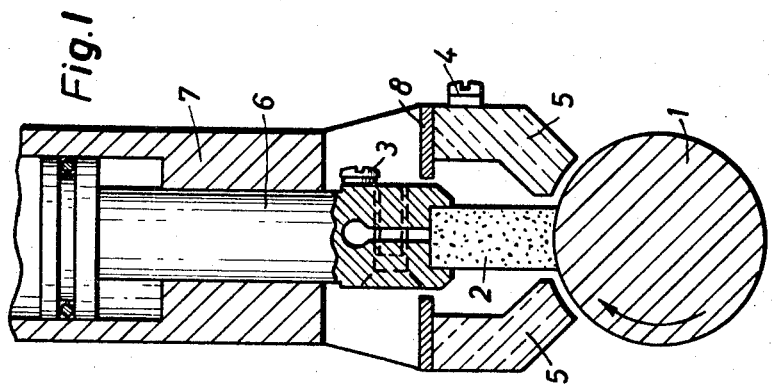

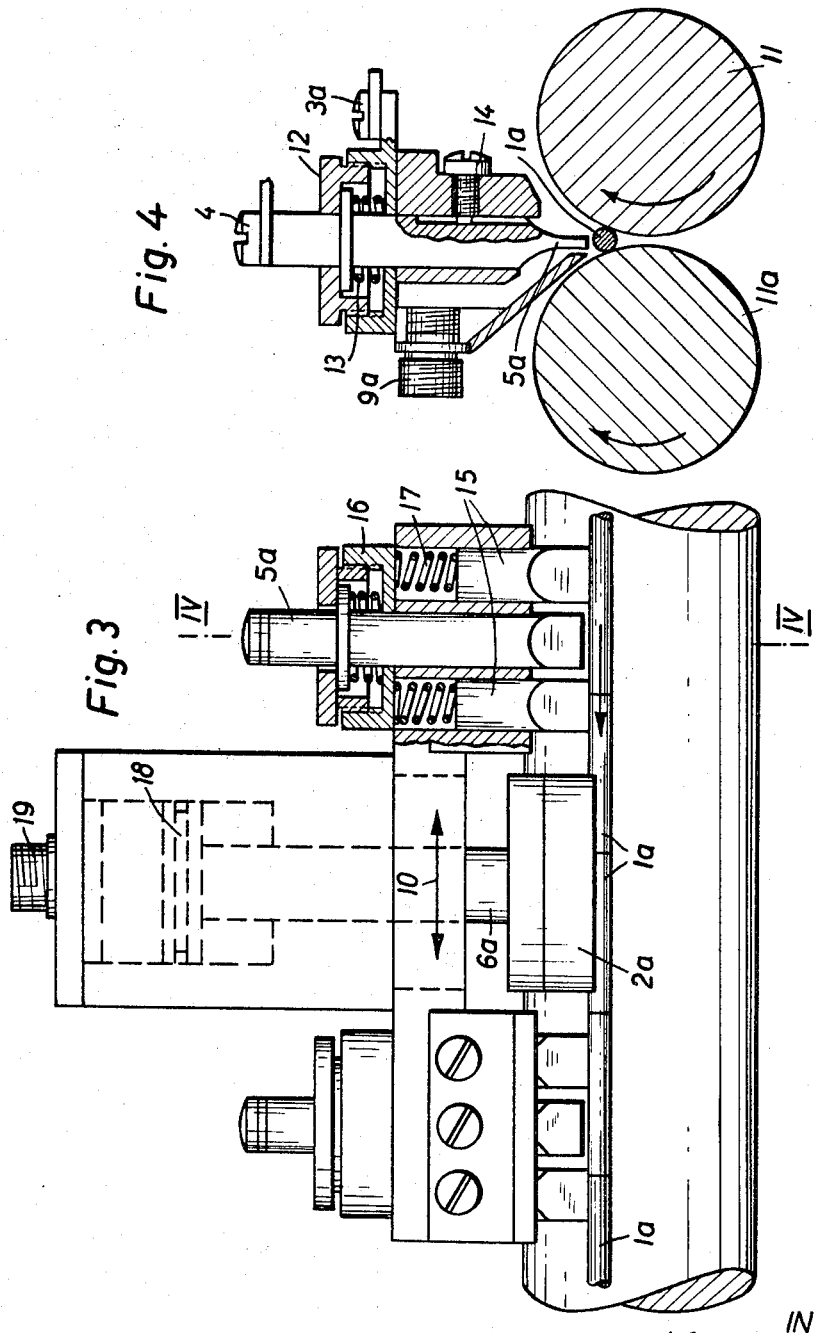

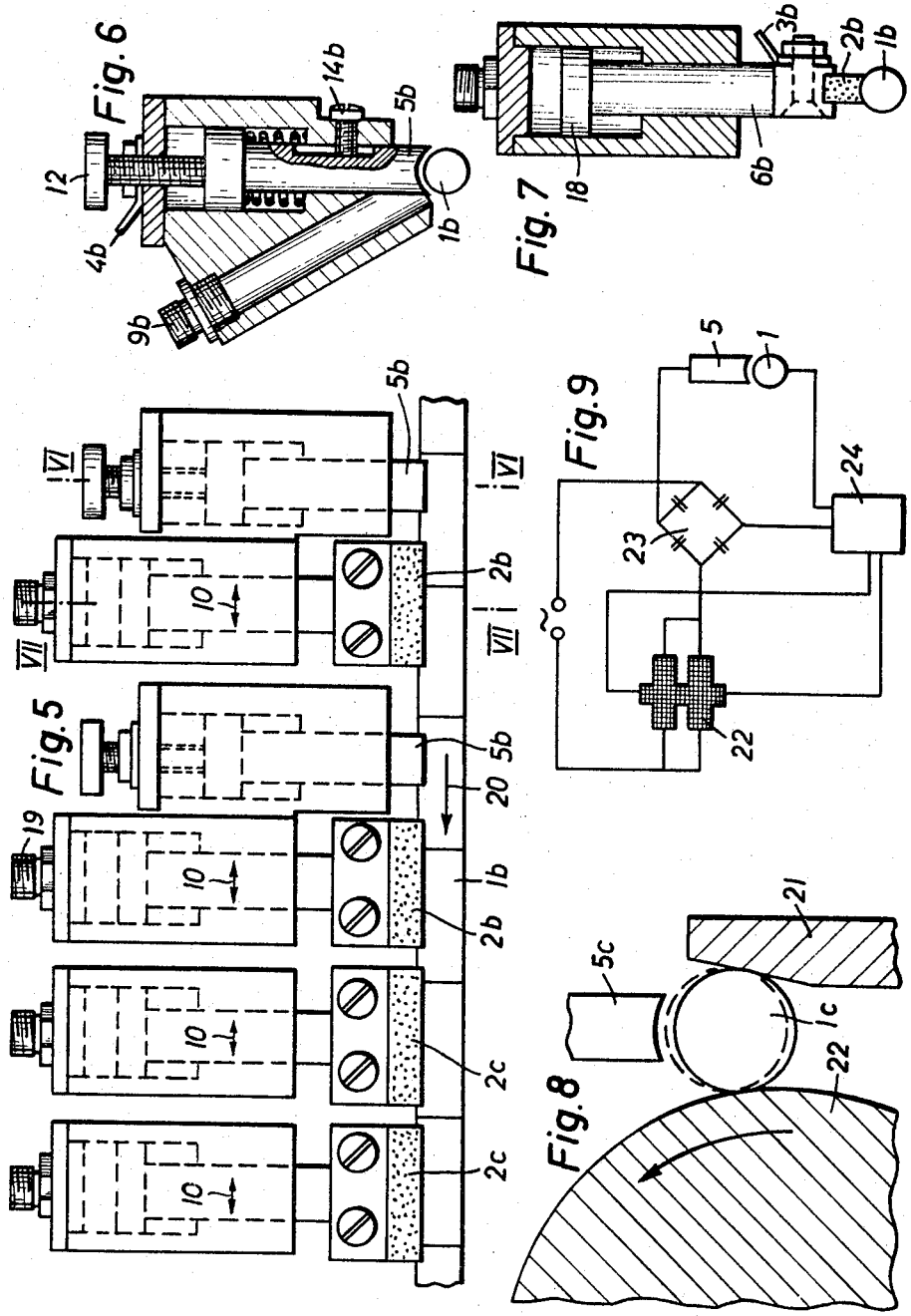

3,442,784
APPARATUS FOR ELECTROLYTICALLY HONING THE EXTERIOR SURFACE OF A CYLINDRICAL WORKPIECE
Karl Wieck, Stuttgart, Germany, assignor to Supfina Wieck & Hentzen, Remscheid, Germany
Filed May 13, 1965, Ser. No. 455,549
Claims priority, application Germany, May 16, 1964, S 91,124
Int. Cl. B23p 1/04
U.S. Cl. 204—217                      1 Claim

ABSTRACT OF THE DISCLOSURE

An apparatus using a combination mechanical and electrolytical treatment for machining the exterior surface of a cylindrical workpiece. The apparatus includes a means for rotating and advancing the workpiece in an axial direction. While the workpiece is moving through the apparatus an axially displaceable working member reciprocates in a direction parallel to the axis of the said workpiece. The working member comprises a counter electrode means and a discharge channel for effecting an electrolytic treatment. The working member also includes a grinding means for effecting a mechanical honing treatment.

BACKGROUND OF THE INVENTION

This invention relates to novel apparatus for and a method of precision machining workpieces and is particularly directed to a honing apparatus of the short-stroke type employed in conjunction with means for removing material by electrolysis.

In conventional short-stroke honing apparatus a plurality of tools, generally including fine-grained grinding or abrading elements, are brought into contact with one or a plurality of workpieces as the latter are conveyed passed the tools. Such apparatus imparts an extremely high surface finish to the workpieces and insures that the particular cross-sectional configuration or overall geometry of the workpieces is attained. Such short-stroke apparatus and methods also operate under relatively low bearing presses i.e., the force or pressure of the tools against the workpieces, which avoid undesirable structural changes in the material of the workpieces due to excessive heat and pressure while permitting the removal of a considerable amount of material which corrects surface faults and maintains the circular and cylindrical concentricity thereof.

Such conventional devices also include many shortcomings. For example, since the honing is done is a series of operations the speed of operation of latter material removal determines the effective operating speed of the devices irrespective of subsequent more rapid operations. In other words, an initial or preliminary machining operation producing a rough surface finish is relatively slow because the honing tools "bite" and cause a reduction in the operating speed of the apparatus.

In accordance with this invention, it is a primary object to provide apparatuses and method which improve the operation of honing devices and at the same time attain a higher output than has been heretofore possible in conventional honing machines.

The invention is characterized by the provision of means for removing metal from workpieces by electrolytic effects followed by a second stage removal of metal by means of longitudinally vibrating grinding tools in the absence of electrolytic metal removing means.

It is admittedly old to remove material (metal) from workpieces by electrolytic processes which generally includes applying a direct current between the tool and the workpiece and an electrolyte between the latter two elements. The workpiece (or workpieces) is connected to the positive pole of the D.C. current source and the tool is connected to the negative side of the electrical source. A reverse connection is also possible, but in either case the amount of material removed is directly dependent upon the intensity of the electric current.

In accordance with this invention a novel coupling is provided between honing means employing grinding tools and electrolytic metal removal means which conjunctively provide many advantages which are not achieved singularly, particularly in the surface finish attained. The surface of a workpiece is first extensively roughened by the electrolytic treatment which presents an excellent surface texture for the subsequent removal of material by short-stroke metal removing means. The bite of the honing tools upon the electrolytically treated surface of a workpiece prevents the impairment of a high surface finish by reducing the number and size of metal "peaks." Such metallic peaks on the workpiece surface are eroded by the electrolyte and more rapid operations by subsequent honing tools is provided because the tool "bite" is reduced. The essential advantage of such apparatus is that large quantities of the material are removed and, at the same time, the surface finish of the workpiece is vastly improved as compared to known metal removing apparatuses and methods.

The advantages of the above is even more noticeably evident when the electrolytic and honing treatments are respectively and alternately repeated which increases the speed of production, attendant cost savings and still more highly finished workpiece surfaces. While the electrolytic material removal means may be stationary, it has also also been found that a reciprocal motion of this noted means also increases operating speeds and eliminates metal erosion found prevalent in electrolytic processes which, again, provides an extremely excellent high gloss workpiece finish.

The above-noted advantages provided by alternating the electrolytic and honing means is believed to occur because the "anodic" coating deposited upon the workpiece surface when the electrolyte ions fail to pass into the electrolyte but are deposited upon the workpiece surface is prevented from reaching an appreciable thickness before being removed by a subsequent honing operation. The honing tools working between adjacent electrodes mechanically clean and remove metal as the workpiece is fed along the work path to subsequent alternating electrolytic and honing means.

The above-novel concept is applicable not only to continuous type processes in which a workpiece is fed between a line of alternating electrolytic and grinding tools but is also equally advantageous in plunge-cut type apparatus. In such plunge-cut apparataus the workpiece is not advanced but is merely rotated about its own axis. In such apparatus the electrolytic and honing means are not arranged in-line but surround the circumference of the workpiece. While stationary or being progressively moved toward the axis of the workpiece while the latter is rotated the same excellent results are obtained as in the in-line practice of the invention.

A further object of this invention is to provide a novel coupling between the electrolytic means and the workpiece to reduce wear due to current breakdown of the electrolytic metal removing means. This is accomplished by providing a plurality of rollers defining a predetermined path of travel of the workpiece. Since the rollers present a greater total surface area along which the workpiece passes, a smaller anodic coating per unit area is produced than in conventional devices employing stationary guides or ramps connected to an electric source. This arrangement also insures that short workpieces are in direct electrical contact with the electrical source at least two points during the entire movement of the workpieces. With larger workpieces a guide or slider bar is provided which is located to contact an uppermost generating line of the workpiece i.e., above the center of the workpiece, with the electrode positioned at a side of the workpiece opposite to the slider bar. This produces a current flow across 180 degrees or greater of the workpiece surface, producing a more efficient current passage and a resultant equally efficient metal removing operation.

In conjunction with or as an alternate to the above-noted current applying arrangement the honing or grinding tools, which is predominantly a mechanical metal removing device, it is an object of this invention to make the honing tools electrically conducting. This is accomplished by impregnating or otherwise providing the grinding tools with metallic, graphite or similar conducting material. With this construction the honing elements both remove metal by electrolysis and remove the conventional anode coating by mechanical grinding or honing.

It is also an object of this invention to apply the above-noted concept to the plunge-cut process heretofore noted, and in addition, to appreciably increase the speed of rotation of the workpiece after the electrolytic removal of metal has been completed. After electrolytic means first removes metal from a workpiece the current is discontinued, the peripheral speed is increased approximately three-fold, and grinding is then initiated followed by gradual removal of the tool which produces a desirable polishing or burnishing effect.

BRIEF DESCRIPTION OF THE DRAWING

The invention will now be described with reference to an exemplary form of the embodiment as shown in the attached drawings in which:

FIG. 1 is a fragmentary sectional view of a novel apparatus constructed in accordance with this invention and illustrates means for electrolytically removing metal from the surface of a workpiece;

FIG. 2 is a side elevational view of the apparatus of FIG. 1 and illustrates means for introducing an electrolyte between a grinding tool and electrode of the apparatus;

FIG. 3 is a side elevational view partially in section of another apparatus constructed in accordance with this invention, and illustrates a reciprocal honing element positioned between a pair of electrolytic metal removing means;

FIG. 4 is a sectional view taken along line IV—IV of FIG. 3, and illustrates means for adjusting an electrolytic metal removal element relative to the periphery of a workpiece being operated upon;

FIG. 5 is a fragmentary side elevational view of another apparatus of this invention, and illustrates a plurality of preceding electrolytic metal removing elements and grinding elements operating upon a moving workpiece;

FIG. 6 is a sectional view taken along line VI—VI of FIG. 5, and clearly illustrates the construction of one of a plurality of identical electrolytic metal removing elements of the apparatus;

FIG. 7 is a sectional view taken along line VII—VII of FIG. 5, and clearly illustrates the construction of one of a plurality of identical honing elements of the apparatus;

FIG. 8 is an enlarged sectional view of a workpiece being operated upon by the apparatus of this invention, and illustrates, in phantom outline, the change in the space between the workpiece and a tool during a metal-removing operation; and FIG. 9 is a circuit diagram illustrating a control circuit for applying and regulating the voltage and current between an electrode of the apparataus and a workpiece.

DESCRIPTION OF THE SPECIFIC EMBODIMENT

Referring first to FIGS. 1 and 2 of the drawings, a workpiece 1 is rotated about its own axis and advances either from left-to-right or right-to-left in FIG. 2 by conventional means (not shown) which may be, for example, a pair of rollers driven in the same direction and with their axes disposed to both rotate and advance the workpiece 1 along a predetermined path. A combined electrolytic and honing apparatus consisting of a grinding tool or element 2 is held against the workpiece 1 by means of a fluid piston 6. A terminal 3 connects the grinding element 2, which is composed of a plurality of abrasive stones etc., with the positive pole of a direct current source of electrical energy (not shown). A pair of electrodes 5 arranged on either side of the grinding element 2 and spaced therefrom are similarly connected to the positive side of the D.C. current source. The electrodes 5 partially surround and are also spaced from the external circumferential surface of the workpiece 1, which is composed of metallic material. The electrodes 5 are secured by screws 4 (only one being illustrated) to the end portion of a cylinder 7 in which the piston 6 is reciprocally mounted. A partition of insulating material 8 maintains each of the electrodes electrically insulated from the cylinder 7. Conduit means 9 is employed to introduce an electrolyte from a conventional source (not shown) into the apparatus during a metal-removing operation. The electrolyte (also not shown) flows into the space between the grinding element 2 and each of the electrodes 5 and is discharged between the workpiece 1 and the electrodes 5. The entire apparatus is continually reciprocated in a direction parallel to the axis of the workpiece 1 as the latter is rotated, as indicated by the arrow 10. During this operation the electrolyte removes metal from the surface of the workpiece 1 followed by the mechanical removal of metal by the grinding element 2 which is continually biased against the surface of the workpiece at a predetermined pressure. In this manner the workpiece 1 is continually and alternately subjected to electrolytic and mechanical grinding to achieve the advantages heretofore noted.

Another apparatus constructed in accordance with this invention is illustrated in FIGS. 3 and 4 of the drawings. In these figures a plurality of workpieces 1a are advanced from right-to-left in the direction of the unnumbered headed arrow in FIG. 3 by a pair of driven rolls or rollers 11, 11a. The rolls 11, 11a are driven in an identical direction (headed arrow of FIG. 4) and the workpieces 1a are supported between the bights of the rolls as is clearly shown in FIG. 4. To achieve the advancement of the workpieces 1a the axes of the rolls 11, 11a converge in the direction of travel of the workpieces. While a pair of rolls 11, 11a are shown with their axes generally parallel to the direction of workpiece travel, a plurality of rolls may also be arranged on either side of the workpieces 1a to advance the workpieces. Rotation is imparted to the workpieces in this latter arrangement by differentially driving the rolls on opposite sides of the workpieces.

As the workpieces 1a travel from right-to-left in FIG. 3 they each first encounter a leading one of a pair of holddown elements 15 arranged at each side of a mechanical grinding tool 2 with an electrolytic metal removing mechanism 5a being positioned between each of the holddown elements 15. The grinding tool 2a is similar to the grinding tool 2 of FIGS. 1 and 2 and is carried by a piston 6a having a piston 18 biased by fluid introduced into a chamber (unnumbered) through a conduit 19.

The identical holddown means or elements 15 to either side of the grinding tool 2 are biased into yielding contact with the workpiece 1a by means of springs 17 received in a housing (unnumbered). Each mechanism 5a between the holddown elements 15 is biased away from the workpieces 1a by springs 13 encompassing the mechanism 5a. The springs 13 are received in housings 16 threadably receiving knurled nuts 12. By manipulating the nuts 12 the position of the mechanisms 5a relative to the workpiece 1a is selected and positively set by means of a set screw 14 having an end portion (unnumbered) received in a channel or groove (also unnumbered) in each of the mechanisms or elements 5a. A connector or conduit 9a is employed to introduce an electrolyte between each element 5a and a partition (unnumbered) to one side thereof. A source of D.C. electrical energy is connected to the elements 5a by a screw 4 and to a housing (unnumbered) by a screw 3a to remove metal in the manner heretofore described in the consideration of the apparatus of FIGS. 1 and 2. Furthermore, the entire apparatus is reciprocated in the direction of the arrow 10 of FIG. 3 by conventional means, not shown.

A further apparatus for the continuous honing or machining of cylindrical ion-pieces 1b is shown in FIGURES 5–7 of the drawings. The workpieces 1b are shown moving along a predetermined path from right-to-left in FIG. 5 as indicated by the arrow 20. This apparatus is generally similar to that shown in FIGS. 3, 4. The workpieces 1b rotate and pass through a leading electrode or electrolytic metal removing element 5b. Thereafter a mechanical honing or grinding tool 2b connected to a positive pole of a D.C. current supply by a connector 4b grinds the surfaces of the workpieces. The workpieces 1b are then acted upon by another electrode 5b and three or more grinding tools 2b–2c. Each of the electrodes is, in the case of the electrode 5a, biased toward the workpieces by springs (unnumbered) and are adjusted relative to the workpieces by a set screw 12. Any adjusted position of the electrodes 5b is positively set by a set screw 14b, in the manner clearly shown in FIG. 6. In lieu of the spring and set screw 12 a piston rod 6b and piston 18 may be employed to regulate the position of the electrodes 5b relative to the workpieces 1b. Conduit means 9b communicates an electrolyte into the apparatus as clearly shown in FIG. 6 of the drawings.

In the environment of the invention a driven roll or roller 22 rotates and advances each of the workpieces 1b, as shown by the workpiece 1c of FIG. 8. A slide bar or guide 21 having an annular surface opposing the periphery of the roll 22 cooperates therewith to guide the workpieces and is adjustable to regulate the span between the workpieces and the electrodes (5c in FIG. 8) as shown in phantom outline.

A circuit (FIG. 9) is illustrated for controlling the voltage and current between the electrodes and workpieces heretofore described, indicated as 5 and 1 respectively. Direct current for the electrolytic erosion of the workpiece 1 is supplied from a rectifier 23 fed from a magnetic amplifier 22. A regulator 24 controls the operation of the magnetic amplifier 22 in a conventional manner such that it supplies voltages varying with the fluctuation of the current intensity to intensify the current.

What is claimed as new is:

1. An apparatus for machining the exterior surface of a cylindrical workpiece with both a mechanical and electrolytical treatment comprising, in combination:
   (a) means for rotating and advancing said workpiece in an axial direction,
   (b) an axially displaceable working member mounted at said exterior surface of said workpiece including an electrically insulative short-stroke abrasive honing tool, an electrode means located on each side of said abrasive honing tool, generally defining a plane transverse the axial direction of the workpiece with said honing tool extending beyond said electrode means whereby to prevent said electrodes from touching said workpiece and maintain a gap therebetween, a channel located between said honing tool and each electrode means for discharging electrolyte between said electrode means said workpiece, and
   (c) a drive means operably connected to said working member to reciprocate said working member in a direction parallel to the axis of said workpiece as said workpiece moves in an axial direction,
   (d) means for circulating electrolyte through said channel and said gap, and
   (e) a source of electricity across said electrodes and said workpiece for making said workpiece predominantly anodic.

References Cited

UNITED STATES PATENTS 2,798,846  7/1957  Comstock _____ 204—143

ROBERT K. MIHALEK, *Primary Examiner.*

U.S. Cl. X.R.

204—288, 224, 143